Nov. 5, 1968   R. J. THIEKEN ETAL   3,408,904
METHOD OF MAKING A FABRIC RUBBERIZED
CONTAINER AND SAID CONTAINERS
Filed April 12, 1967   2 Sheets-Sheet 1

INVENTORS
RALPH J. THIEKEN
ERNEST KNAUS

J.D. Wolfe
ATTORNEY

Nov. 5, 1968　　　R. J. THIEKEN ETAL　　3,408,904
METHOD OF MAKING A FABRIC RUBBERIZED
Filed April 12, 1967　　CONTAINER AND SAID CONTAINERS
2 Sheets-Sheet 2
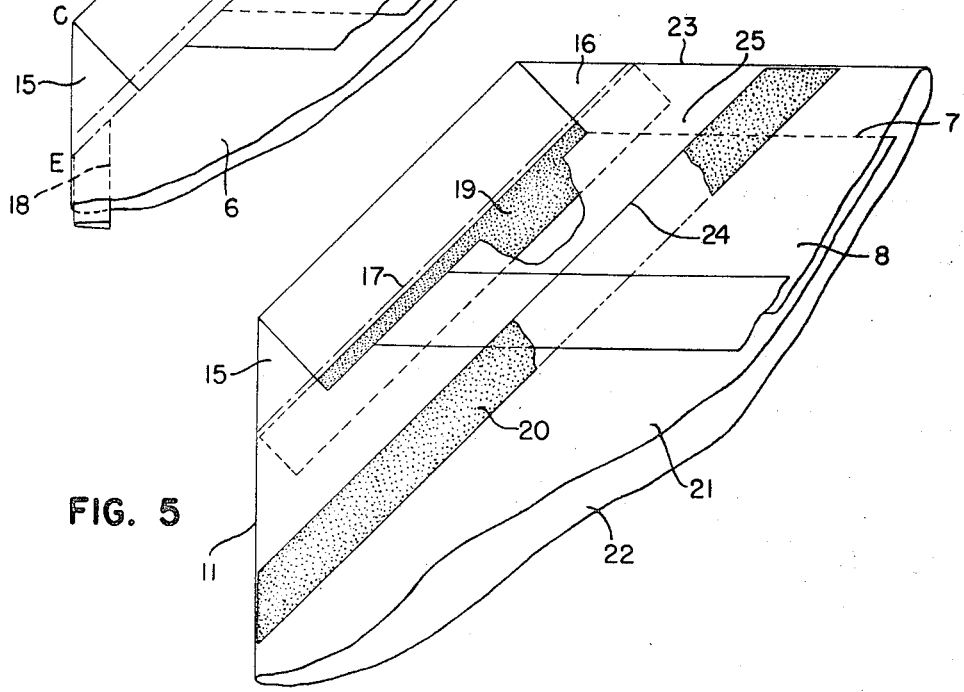
FIG. 4
FIG. 5
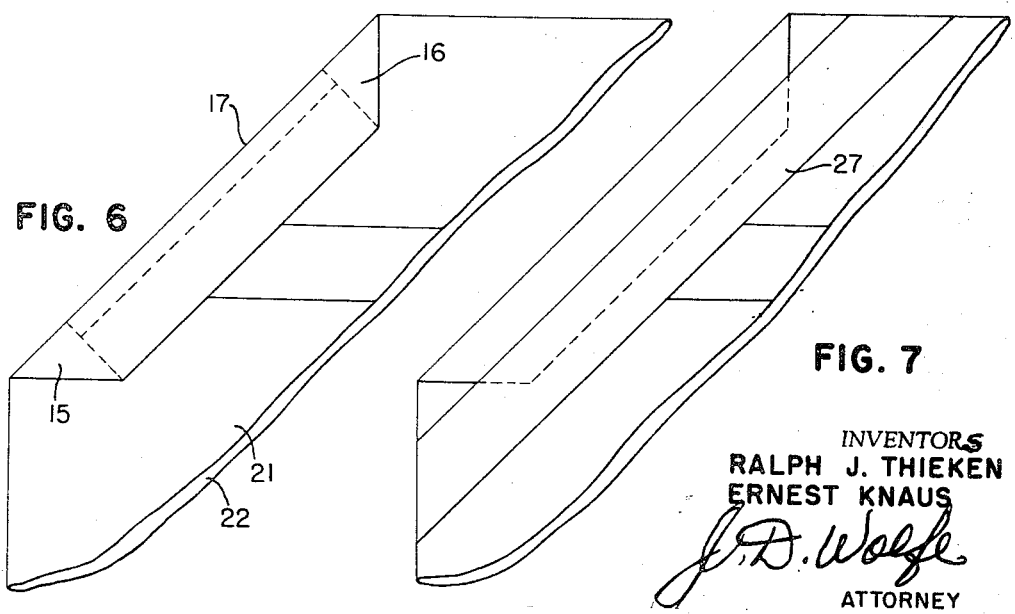
FIG. 6
FIG. 7
INVENTORS
RALPH J. THIEKEN
ERNEST KNAUS
J. D. Wolfe
ATTORNEY

United States Patent Office 3,408,904
Patented Nov. 5, 1968

3,408,904
METHOD OF MAKING A FABRIC RUBBERIZED CONTAINER AND SAID CONTAINERS
Ralph J. Thieken, Goodyear, Ariz., and Ernest Knaus, Akron, Ohio, assignors to The Goodyear Tire & Rubber Company, Akron, Ohio, a corporation of Ohio
Filed Apr. 12, 1967, Ser. No. 630,383
2 Claims. (Cl. 93—35)

ABSTRACT OF THE DISCLOSURE

This invention provides a method of constructing elastomeric coated fabric containers wherein the method of sealing the corners and the corner construction is improved by cutting the end flap seam on the bias to give an improved corner construction and reduce its thickness in the corner due to the piling up of the amount of fabric, adhesive and other rubber materials used in making up containers of this construction.

---

This invention relates to a method of constructing fabric reinforced elastomeric containers and more specifically this invention relates to the method of constructing fabric reinforced elastomeric containers having an improved corner construction and to said containers per se.

Heretofore one of the problems associated with the construction of fabric reinforced elastomeric containers has been the construction of a corner that would withstand the stress and strain associated with transporting liquids in such elastomeric containers and also to provide a leak-proof corner in said containers. This has been achieved heretofore by using corner construction blocks with overlays of fabric and has a tendency to produce corners that were unusually thick in fabric and elastomeric materials and thus has been both unsightly and difficult to handle, especially when it was attempted to roll the tanks up into a small bulk package for transporting or storing empty. Also, the prior art methods of corner construction required extensive hand labor and were quite costly.

It is an object of this invention to provide an improved method for constructing a fabric reinforced elastomeric tank.

Figure 1:
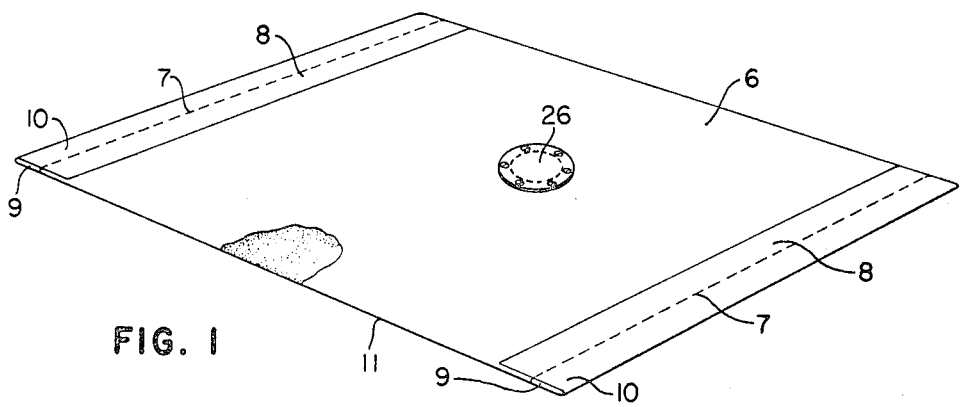
Figure 2:
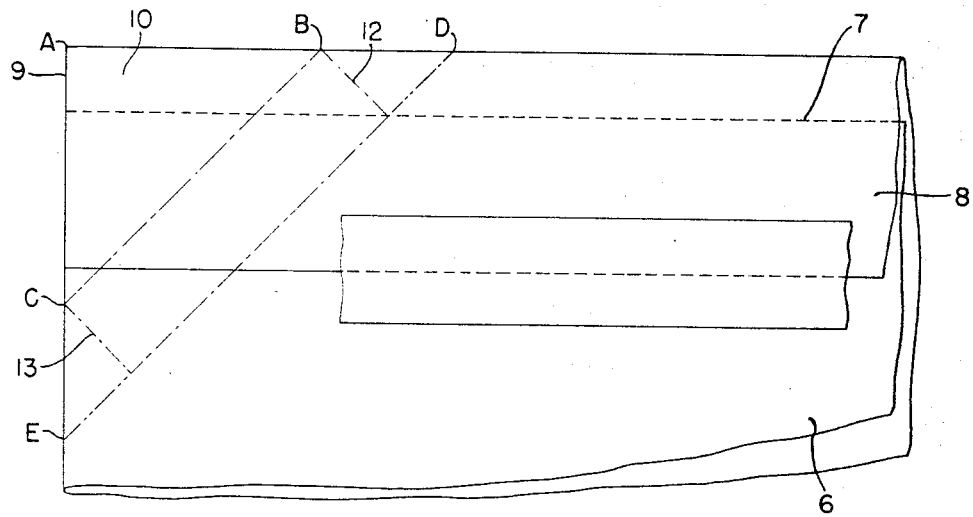
Figure 3:
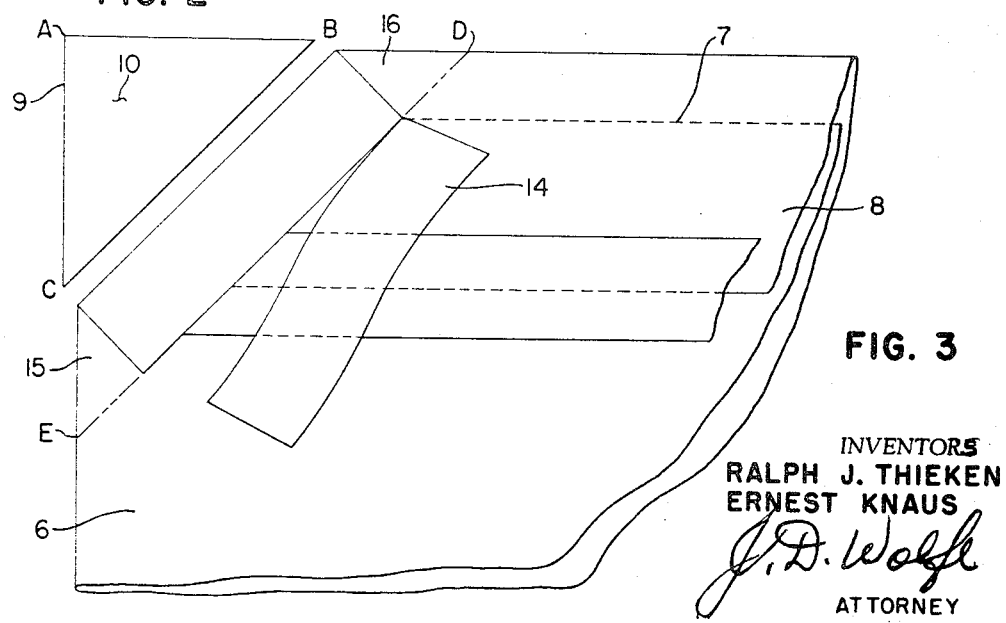

The objects and advantages of this invention may be more clearly seen by reference to the drawing wherein FIG. 1 is a plan view of the fabric as it is displayed spread flat on a plane surface as a tube having the ends closed. FIG. 2 is an enlargement of one corner of the tube shown in FIG. 1. FIG. 3 is another view of FIG. 2 at a later stage in the construction of said container. Likewise, FIG. 4 is a further view at a still later stage of construction than that shown in FIG. 3. FIG. 5 is a view of the corner construction showing the location of the masking tape. FIG. 6 is a view of the corner construction showing fabric having small portions cut therefrom folded back over the fabric having the large portion cut therefrom to close the opening. FIG. 7 is a view of the finished and closed corner section.

Referring specifically to FIG. 1, a tube 6 has been formed and spread flat on a planular surface. This tube has two ends 7. These ends have been closed by folding the fabric 8 back over the end indicated by the dashed line 7. The folded fabric may be sewn or both sewn and cemented to the body of the tube to close the ends 7 of the tube except for the openings 9 in the corner sections 10.

This fabric may be elastomer coated either prior to or after the tube is formed. The elastomeric coating may be applied by calendering on the elastomer to the fabric prior to tube formation or alternately it may be applied by spraying, dipping or swabbing on a dispersion of the elastomer or reactive components which react to form the elastomer in situ.

With the tube displayed by spreading it flat on the flat surface as shown in FIG. 1 the openings 9 in one of the corner sections 10 at each end may need to be slit as seen in FIG. 1 to permit removal of the flat pressure member used to permit pressure to be applied to the fabric during the cementing of the fabric flap 8 to the tube body 6. Obviously, the slitting of the opening 9 along edge 11 of the tube as displayed should be no more than that necessary to permit the flat pressure member to be removed.

With the flat pressure member removed from the tube, the opening 9 in each corner section 10 may be closed by marking two triangles on the corner section in the manner best seen in FIG. 2. These right triangles are designated respectively by the letters ABC and ADE. Although these right triangles are isosceles triangles, it should be evident that this is only a preferred feature as other triangles or configurations could be used. Depending on the size of the tank and the amount of lap desired in the seam area, the length of the sides of the triangle may vary, but in practice, the use of a length of 15 inches for sides AB and AC for triangle ABC and 22 inches for sides AD and AE for triangle ADE has been found to be very satisfactory.

With the triangles marked in the corner section, the triangle ABC is cut away and removed to leave the tube in the corner section having an opening along line CB. Then the top part of the tube is cut along lines 12 and 13 to the line DE and then along line DE between lines 12 and 13 to remove the top fabric as the rectangular piece 14 shown in FIG. 3 to thereby leave the two triangular flaps 15 and 16 at the ends where the rectangular piece 14 was removed. Instead of cutting away the large portion to leave triangles, rectangles or other suitable figures may be used.

As shown in FIG. 4, line 17 is marked on the bottom part of the fabric of the tube exposed by cutting away of the rectangular piece 14. Preferably line 17 is marked parallel to line DE and about a half to one inch therefrom. This line serves as the fold line to fold the fabric over onto the tube body 6 to close the opening formed by cutting away the rectangular strip 14 along line DE.

Before making the fabric fold over along line 17, it is preferred that a masking strip to which the cement does not adhere of sufficient length and width, usually about 8" by 3", is placed inside the tube along the line BD and along the line CE. The position of these masking strips 18 are shown best in FIG. 4. Also, a masking strip is positioned in the corner section in the positions shown by numerals 19 and 20. The masking tape is used to keep the cement from flowing under the edges of the fabric and cementing the top and bottom of the fabric together in areas other than the seam area. With the masking tape in place a corner section template having a surface to which the cement does not adhere is preferably placed inside the corner between the top 21 and bottom 22 fabric with the rear edge of the template in alignment with fold line 17 and the end sides thereof flush with lines 11 and 23 respectively of the tube. As the template serves to transmit pressure to the fabric during the cementing of the fabric to close the opening of the corner section it should be wide enough to extend beyond the area being cemented. After the seam is cemented, the construction template is removed from the container through opening 26.

A suitable cement is applied to the rectangular portion exposed by cutting away fabric portion 14 and to the top and under side of triangles 15 and 16. Also, it is preferred to apply cement to the seam area 25 between lines 17 and 24 before folding the fabric forward over the area between line 17 and 24 with line 17 being the fold line. With the fabric folded over in this manner and smoothed out to remove any folds or creases, the overlapped portion in the seam area 25 is pressed firmly together until the cement has dried or set to give the finished corne rsection construction shown in FIG. 6 after removal of the masking strips.

With the front and back panels of the fabric in the end section cut in the manner described above in regard to FIGS. 1 through 6, and folded over in the manner shown in FIG. 6 and cemented, it is preferred that a strip 27 be cemented over the lap seam in the manner shown in FIG. 7 to give the closed corner section greater strength.

A preferred method of building elastomeric fabric containers of the type to which this invention is directed is illustrated in Serial No. 611,773, filed Jan. 25, 1967. This patent application not only describes a preferred technique for making elastomeric containers by cementing the fabric back and front panels together to form the tube but also describes cements which may be utilized in cementing the corner section in accordance with the teachings of this invention. Although these cements are preferred, any of the cements of either the natural or synthetic rubber type used in fabric container construction may be used.

While certain representative embodiments and details have been shown for the purpose of illustrating the invention, it will be apparent to those skilled in the art that various changes and modifications may be made therein without departing from the spirit or scope of the invention.

What is claimed is:

1. In a method of making an elastomeric coated fabric container having the fabric shaped into an elastomeric coated fabric tube having at least one end thereof closed with an elastomeric coated fabric except for an opening in the corner sections thereof, said tube being displayable to expose the opening in the corner section in substantial alignment with the folded edge and at right angles to the end edge of the tube, the improvement comprising (1) cutting away sufficient portions of the fabric in both the top and the bottom of the tube in the corner section between the fold edge and the end edge thereof to include the original opening in said corner section with one portion cut from the tube being the small portion and the other portion benig the large portion with the large portion being cut from the tube to leave at least some of the fabric in the folded edge and the end edge extending down to the point where the cut line made by cutting away the smaller portion from the fabric contacts the fold edge and the end edge respectively, (2) applying cement to the fabric at least in the corner section seamed area, and (3) forming a seam by turning the fabric having the small portion cut therefrom over a fold line on to the fabric having the large portion cut therefrom and cementing the turned-back fabric to the tube body to thereby close the opening in the corner section.

2. In the method of closing a corner section opening of claim 1, the improvement wherein a large portion of fabric is cut from the front panel of the tube and a small portion is cut from the back panel of the tube, with the amount of fabric removed in the larger portion being cut essentially as a rectangular piece of fabric and extending beyond the line where the small portion has been cut from the back panel into the body of the tube.

References Cited

UNITED STATES PATENTS

| | | | |
|---|---|---|---|
| 2,043,782 | 6/1936 | Sprosty | 93—35 |
| 2,103,092 | 12/1937 | Robinson | 93—35 |
| 2,323,629 | 7/1943 | Spanel | 93—35 |
| 2,369,716 | 2/1945 | Coghill | 93—35 |
| 2,445,757 | 7/1948 | Belcher | 93—35 |
| 2,660,100 | 11/1953 | Doyle | 93—8 |

WAYNE A. MORSE, JR., *Primary Examiner.*